(12) United States Patent
Gates et al.

(10) Patent No.: US 9,600,577 B2
(45) Date of Patent: *Mar. 21, 2017

(54) ESTIMATING DATA TOPICS OF COMPUTERS USING EXTERNAL TEXT CONTENT AND USAGE INFORMATION OF THE USERS

(71) Applicant: International Business Machines Corporation, Armonk, NY (US)

(72) Inventors: Christopher Gates, West Lafayette, IN (US); Youngja Park, Princeton, NJ (US)

(73) Assignee: International Business Machines Corporation, Armonk, NY (US)

(*) Notice: Subject to any disclaimer, the term of this patent is extended or adjusted under 35 U.S.C. 154(b) by 97 days.

This patent is subject to a terminal disclaimer.

(21) Appl. No.: 14/038,220

(22) Filed: Sep. 26, 2013

(65) Prior Publication Data

US 2015/0039618 A1    Feb. 5, 2015

Related U.S. Application Data

(63) Continuation of application No. 13/956,995, filed on Aug. 1, 2013.

(51) Int. Cl.
*G06F 7/00* (2006.01)
*G06F 17/30* (2006.01)

(52) U.S. Cl.
CPC ............... *G06F 17/30864* (2013.01)

(58) Field of Classification Search
CPC ............... G06F 17/30864; G06F 19/20; G06F 2221/2145; G06F 21/121

USPC .................. 707/738, 739, 748, 750, 999.009
See application file for complete search history.

(56) References Cited

U.S. PATENT DOCUMENTS

| | | |
|---|---|---|
| 7,082,429 B2 * | 7/2006 | Lin et al. ............. 707/710 |
| 7,958,147 B1 | 6/2011 | Turner et al. |
| 8,407,194 B1 | 3/2013 | Chaput et al. |
| 8,407,217 B1 | 3/2013 | Zhang |
| 8,438,149 B1 * | 5/2013 | Dicker et al. ............. 707/706 |
| 8,630,975 B1 | 1/2014 | Guo et al. |
| 9,009,148 B2 * | 4/2015 | Gao et al. ............. 707/728 |
| 2002/0138478 A1 | 9/2002 | Schwartz et al. |
| 2004/0189682 A1 * | 9/2004 | Troyansky et al. ........... 345/700 |
| 2005/0066350 A1 | 3/2005 | Muleman |
| 2006/0074830 A1 * | 4/2006 | Mojsilovic ............. 706/45 |
| 2006/0212415 A1 * | 9/2006 | Backer et al. ............. 706/45 |
| 2007/0118498 A1 | 5/2007 | Song et al. |
| 2008/0059474 A1 | 3/2008 | Lim |

(Continued)

FOREIGN PATENT DOCUMENTS

WO    WO 2013138859 A1 *    9/2013

OTHER PUBLICATIONS

Blei et al., Latent Dirichlet Allocation, Journal of Machine Learning Research, Jan. 2003, vol. 3, pp. 993-1022.

(Continued)

*Primary Examiner* — Mohammed R Uddin
(74) *Attorney, Agent, or Firm* — Scully, Scott, Murphy & Presser, P.C.; Jeff S. LaBaw (57) ABSTRACT

Automatically estimating content topics of inaccessible content in a computer system, in one aspect, may comprise gathering accessible content and analyzing the accessible content to estimate one or more topics of the inaccessible content.

13 Claims, 5 Drawing Sheets

(56) References Cited

U.S. PATENT DOCUMENTS

| | | |
|---|---|---|
| 2008/0216174 A1 | 9/2008 | Vogel et al. |
| 2008/0319974 A1 | 12/2008 | Ma et al. |
| 2009/0193016 A1* | 7/2009 | Jones ............... G06F 17/30864 |
| 2009/0249496 A1* | 10/2009 | Ohgushi ........................ 726/34 |
| 2010/0010968 A1 | 1/2010 | Redlich et al. |
| 2010/0088161 A1 | 4/2010 | Parenti et al. |
| 2010/0153318 A1 | 6/2010 | Branavan et al. |
| 2010/0161611 A1 | 6/2010 | Guo et al. |
| 2011/0106743 A1* | 5/2011 | Duchon ........................ 706/46 |
| 2011/0178868 A1 | 7/2011 | Garg et al. |
| 2011/0213655 A1* | 9/2011 | Henkin et al. ............. 705/14.49 |
| 2011/0258188 A1* | 10/2011 | AbdAlmageed et al. .... 707/736 |
| 2011/0258229 A1 | 10/2011 | Ni et al. |
| 2012/0030206 A1* | 2/2012 | Shi et al. ..................... 707/738 |
| 2012/0078895 A1 | 3/2012 | Chu-Carroll et al. |
| 2012/0078918 A1 | 3/2012 | Somasundaran et al. |
| 2012/0203752 A1 | 8/2012 | Ha-Thuc et al. |
| 2012/0209871 A1 | 8/2012 | Lai et al. |
| 2013/0117677 A1 | 5/2013 | St. Jacques, Jr. |
| 2013/0159254 A1 | 6/2013 | Chen et al. |
| 2013/0159320 A1 | 6/2013 | Gao et al. |
| 2013/0183022 A1 | 7/2013 | Suzuki et al. |
| 2014/0046976 A1 | 2/2014 | Zhang et al. |
| 2014/0067815 A1* | 3/2014 | Sun et al. ..................... 707/739 |
| 2014/0214835 A1 | 7/2014 | Oehrle et al. |
| 2014/0280150 A1* | 9/2014 | Hernandez et al. .......... 707/737 |
| 2014/0280166 A1 | 9/2014 | Bryars et al. |
| 2015/0046151 A1* | 2/2015 | Lane et al. ....................... 704/9 |

OTHER PUBLICATIONS

Mogull, DLP Content Discovery: Best Practices for Stored Data Discovery and Protection, Jun. 2008, pp. 1-16, http://www.emea.symantec.com/discover/downloads/DLP-Content-Discovery-Best-Practices.pdf.

Park et al., System for Automatic Estimation of Data Sensitivity with Applications to Access Control and Other Applications, SACMAT'11, Jun. 15-17, 2011, pp. 145-146.

Sokolova et al., Personal Health Information Leak Prevention in Heterogeneous Texts, Proceedings of the Workshop Adaptation of Language Resources and Technology to New Domains, Sep. 2009, Borovets, Bulgaria, pp. 58-69.

Park et al., An Experimental Study on the Measurement of Data Sensitivity, Badgers'11, Apr. 10, 2011, Salzburg, Austria, pp. 70-77.

Office Action dated May 5, 2015 received in the parent application, namely, U.S. Appl. No. 13/956,995.

Office Action dated Apr. 20, 2016 received in parent U.S. Appl. No. 13/956,995, 18 pages.

* cited by examiner

ESTIMATING DATA TOPICS OF COMPUTERS USING EXTERNAL TEXT CONTENT AND USAGE INFORMATION OF THE USERS

CROSS-REFERENCE TO RELATED APPLICATIONS

This application is a continuation of U.S. Ser. No. 13/956,995, filed on Aug. 1, 2013, the entire content and disclosure of which is incorporated herein by reference.

FIELD

The present application relates generally to computers, and computer applications, and more particularly to estimating content topics of inaccessible assets.

BACKGROUND

Knowing what kinds of data are stored in computers and how sensitive the data are may ensure the security of the data in an organization. Traditionally, the data classification is primarily done manually by the system administrators, e.g., by labeling data ranging from the most sensitive (e.g., "Top Secret")) to the least sensitive (e.g., "Unclassified"). However, manual labeling is not feasible for a large organization where there are billions of data files. Recently, technologies have been developed for automated data content inspection for the purpose of data loss prevention. However, these methods suffer from several major limitations. For example, crawling and classifying a huge number of files consume substantial computing power and pose significant impact on the system performance; Direct access to the computers is required to scan the data content, which is challenging for an organization with many heterogeneous systems; Building data classification systems for a large number of categories is very time consuming; The classifiers are domain dependent, and need to be retrained for a new domain; Content inspection is not allowed for some cases where data privacy and security is a concern, thus, these techniques cannot be applied at all.

BRIEF SUMMARY

A method to automatically estimate content topics of inaccessible content in a computer system, in one aspect, may comprise gathering accessible content. The method may also comprise analyzing, by a processor, the accessible content to estimate one or more topics of the inaccessible content.

A system to automatically estimate content topics of inaccessible content in a computer system without inspecting data files in the computer system, in one aspect, may comprise a module operator to execute on a processor and further operable to gather accessible content. The module may be further operator to analyze the accessible content to estimate one or more topics of the inaccessible content.

A computer readable storage medium or device storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

The present disclosure, in one aspect, describes a method and a system for estimating the topics of data content stored in computers without inspecting the data contents. The method and system in one aspect may lead to a more scalable and privacy-preserving approach to topic discovery than is currently available. In one embodiment, a new approach is proposed to estimate the content types (or topics) only by analyzing the user information and other external text contents associated with the users (referred to as user contents). The user information may include the list of users who have accessed the computer and the frequency of the access. The external user contents may include any text contents associated with the users that are available in the organization's online spaces but outside of the target computer, such as their job responsibilities in the employee directory, the names of the communities or wiki pages the users belong to (or other web or the like pages the users may edit or create) and the papers or patents which the users published, and others.

The method in one embodiment of the present disclosure estimates the topics of the data stored in a computer based on the external text contents generated by the computer users. For instance, if many users of a computer work on computer security, the titles of papers and patents and the project web pages may include many computer security-related terms. The method in one embodiment of the present disclosure also uses the frequency of access by a user as a weighing factor for the terms associated with the user. For instance, if user A accesses the computer more often than user B, A has a higher impact on the topics of the computer.

In one embodiment of the method of the present disclosure, the data content of a computer or asset may be represented by the users' text contents collected from the company's public on-line space, and the frequency of each word may be simulated with the frequency the user access the computer or asset. Then, a computer or asset may be represented as a document of a bag of words with their counts reflecting the user's level of influence on the machine. The method of the present disclosure in one embodiment may then apply a topic discovery algorithm such as generative topic modeling to discover the latent topics in the collection of the computers or assets. The generative topic modeling method produces a probability distribution over topics for each computer or asset, which represents the proportions of the computer or asset belonging to each topic.

The method of the present disclosure in one embodiment may perform topic discovery over a set of enterprise machines in a way that preserves the company's security policy and user privacy. The method in one embodiment of the present disclosure may estimate topics based on, or using, only meta-level data, e.g., when the real content is not accessible due to various reasons. The method in one embodiment of the present disclosure, instead of using the real content, may exploit other text contents the user created or consumed to estimate what kinds of data the user might have generated in the computer, which then may be used to infer or determine the topic of the computer or documents contained therein.

The method and system of the present disclosure in one embodiment may overcome limitations of both manual and automatic data classification approaches currently existing, for example, by utilizing external data content and user information. Generally, the method and system of the present disclosure in one embodiment may automatically estimate content topics of inaccessible content in a computer system without inspecting data files in the computer system by gathering accessible content and analyzing the accessible content to estimate topics of the inaccessible content.

Figure 1:
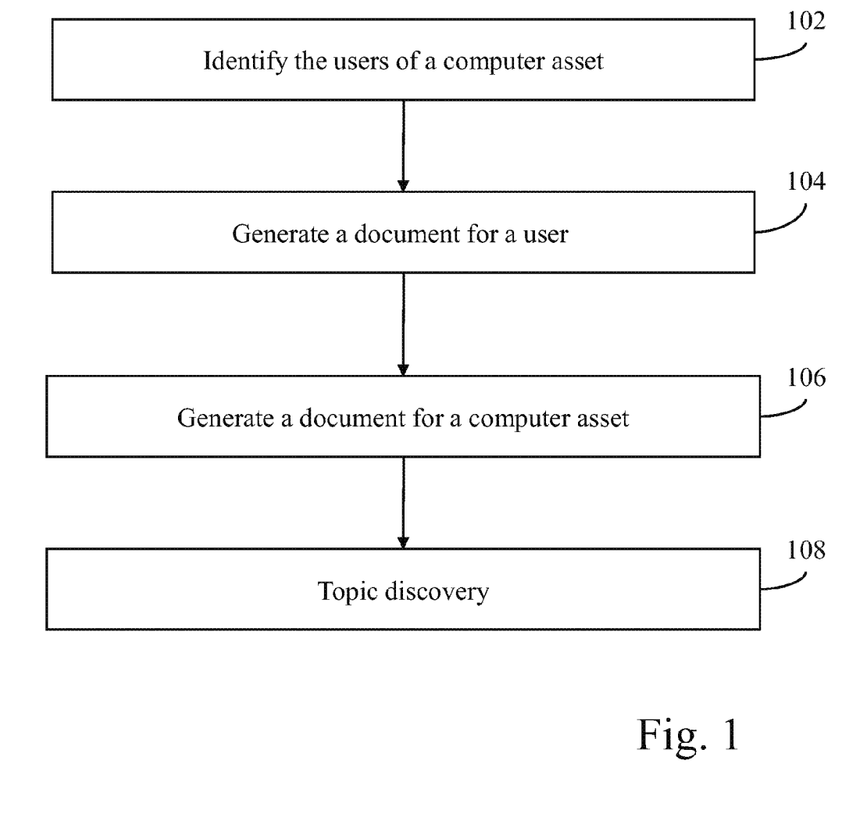
FIG. 1 is a high-level flow diagram illustrating a method of the present disclosure in one embodiment.

FIG. 1 is a high-level flow diagram illustrating a method of the present disclosure in one embodiment. At 102, users of a computer (or an asset such as computer asset) whose topic is being estimated are identified. While the contents of the computer may not be accessible, the information associated with the users who access or use the computer may be accessible.

The users for a computer can be identified, for example, by the system administrators or by analyzing the access logs for the computer. The system administrators of a computer, for instance, may identify users of the computer. However, in large organizations, where there are a large number of computers and the computers are managed by many different administrators, manually collecting all users and how often each user accesses the computer may be time-consuming and not always possible.

Another way to identify users is to automatically identify the users and their access counts from access logs. Some access logs, such as logs for a file repository or a system log-on, contain the user accounts, thus, identifying the users may be identified for such logs. For computer network assets, user accounts are generally not available in the logs (e.g., DNS logs). Instead, the logs contain the Internet Protocol (IP) address from which the lookup was requested. The process of determining which user is performing a DNS lookup is not a trivial task. The method in one embodiment of the present disclosure may find the most likely candidate user who is assigned to a specific IP address during a specific time period. The resolution of an IP address to a user may become challenging in a dynamic system with many different ways to access the network and with a large set of users. Users can log into the network over WiFi or using an Ethernet cable, or from remote locations via VPN (virtual private network).

For computers in a network, the method in one embodiment of the present disclosure may perform the IP to user mapping using various sources, e.g., including media access control (MAC) addresses, application (e.g., internal web portals) logs, and WiFi logs. If the MAC address is present, then, during a DHCP session setup, the method in one embodiment of the present disclosure may correlate the MAC address used for that session to the IP address that is assigned, which, in turn, provide an IP to user mapping. In other situations, the MAC addresses may be not reliable, e.g., for users using OS X and may be often unavailable when new devices are introduced. To alleviate the limitations, the method in one embodiment of the present disclosure may also use application and WiFi logs for the user mapping. The application level logs can correlate the act of a user logging into an application (such as an internal web portal) to an IP address. The WiFi logs can correlate a user establishing a connection to the WiFi with the authentication credentials that are used to log in to the system. In one aspect, the method in one embodiment of the present disclosure may discard all DNS lookups for which the method is unable to identify the user and all logs that are resolved to more than one user (i.e., ambiguous logs).

At 104, external data content is collected for each of the identified users and a pseudo document for each of the identified users may be generated. In one aspect, the method of the present disclosure in one embodiment may exploit external content data that are generated by the users of the target computers and are publicly available in the organization, to surrogate the data content in the target computers. External contents of a user may include any documents or data sources the user produced outside the target asset (computer or asset whose topic is being estimated), such as papers, patents, and project web pages, and others. These external contents may be used to infer the user's job responsibilities and the tasks the user is working on. In one aspect, the method of the present disclosure in one embodiment may only extract the contents that can be accessed without an access permission to the host system. Some examples of external data content may include, but are not limited to: Published documents such as patents and papers; Files the user has shared in a file-sharing site; Wiki or project websites where the user is a member of; Personal web pages; Blogs created by the user; Tags the users added on web pages. All data associated with those documents, e.g., the titles and other meta-level data, may be utilized.

The method of the present disclosure in one embodiment may combine all the external data published by a user and generate a document for the user using the bag-of-word representation. The method of the present disclosure in one embodiment may remove stop words (and the like) from the generated document. Stop words refer to very commonly used words in documents such as prepositions (e.g., "to", "in") and pronouns (e.g., "I", "this"), which are usually filtered out in natural language data processing. The method of the present disclosure in one embodiment may count the occurrences of each word in the user document. The basic assumption is that more frequently used words indicate the topics of the user more strongly than less frequently used words.

At 106, a document for the computer is generated by combining the documents of all users of the computer (e.g., collected and generated at 104). The method of the present disclosure in one embodiment may then generate a hypothetical document for a computer or asset by combining the documents of its users. In one aspect, it may be assumed that the users who access the asset more frequently influence the content of the asset more than the users who use it occasionally. The method of the present disclosure in one embodiment may scale the frequency of words in the user documents based on the frequency of the user's access. The frequency, for example, may be defined as the number of days the user accessed the asset. The words in an asset document come from external contents generated by the asset users, and the counts of the word occurrences in the document are determined based on both the word counts in the user documents and the users' access counts for the asset.

Definition 1 provides a formal description.

Definition 1. Let asset A have n users, $U=\{u_1, \ldots, u_n\}$, and the document of a user $u_i$ be $D(u_i)$. Then, the document of asset A, $D(A)$, is defined as $D(A)=\bigcup_{u_i \in U} \bigcup_{w_j \in D(u_i)} w_j$. Further, the count of a word in $D(A)$, $c(w_j)$, is computed as $$c(w_j) = \sum_{i=1}^{n} \partial_i \cdot c(w_{ji}),$$

where $c(w_{ji})$ is the count of word $w_j$ in $D(u_i)$, and $\partial_i$ is the weight of user $u_i$ for the asset A and defined as $\log(\#days(u_i, A))$. In the present disclosure, weight of user is also referred to as a score of user.

At 108, a topic clustering or categorization may be applied on the collection of documents of computers. Once a document representation of an asset is generated, a set of assets can be considered as a collection of documents. A methodology of the present disclosure in one embodiment then processes the document collection to discover the topics of the documents and identify documents containing sensitive information.

In one embodiment, a methodology of the present disclosure may apply a topic classification technique to label each document with one or more topics in predefined topic categories. If an organization has defined a list of topics which are considered to be sensitive, the classifier can identify documents belonging to these sensitive topics.

Another embodiment of the method of the present disclosure may apply Latent Dirichlet Allocation (LDA), a generative topic modeling technique, to discover the topics from a collection of documents. LDA is a probabilistic generative model for collections of discrete data such as text collections. Each document in a corpus is modeled as a finite mixture over underlying set of topics, and each topic is, in turn, modeled as a distribution over words. LDA allows for multiple topic assignments to a document (i.e., probabilistic clustering) and, thus, better explains the underlying topic distributions in the given corpus. LDA assumes the following generative process for creating a document d in a collection of document D:

1. For each document d∈D, a distribution over topics is sampled from a Dirichlet distribution, $\theta \sim Dir(\alpha)$.
2. For each word w in a document, select a topic, z, according to the distribution, Multinomial($\theta$).
3. A word is chosen from a multinomial probability conditioned on the topic, $p(w|z, \beta)$. $\beta$ is a matrix of word probabilities over topics which is to be estimated from the training data.

LDA takes as an input parameter the number of topics to be discovered. As an example, LDA may be run with 40 topics, and, therefore, each asset may be represented as a probability distribution over the 40 topics. Table 1 shows three sample topics discovered from the example data set.

TABLE 1

| Topics | Most Relevant Words |
|---|---|
| Topic5 | speech, recognition, system, using, models, language, translation, based, detection, arabic, transcription, model, speaker |
| Topic28 | business, community, management, analytics, method, system, supply, project, BAMS, data, performance, applications, research |
| Topic37 | system, computing, virtual, security, community, secure, method, research, data, trusted, applications, operating |

Table 1 shows sample topics discovered from document representations of computer servers. Topic5 indicates Speech Recognition, Topic28 is related to Analytics and Business Intelligence. BAMS stands for business analytics and management. Topic37 is related to Computer Security.

Figure 2:
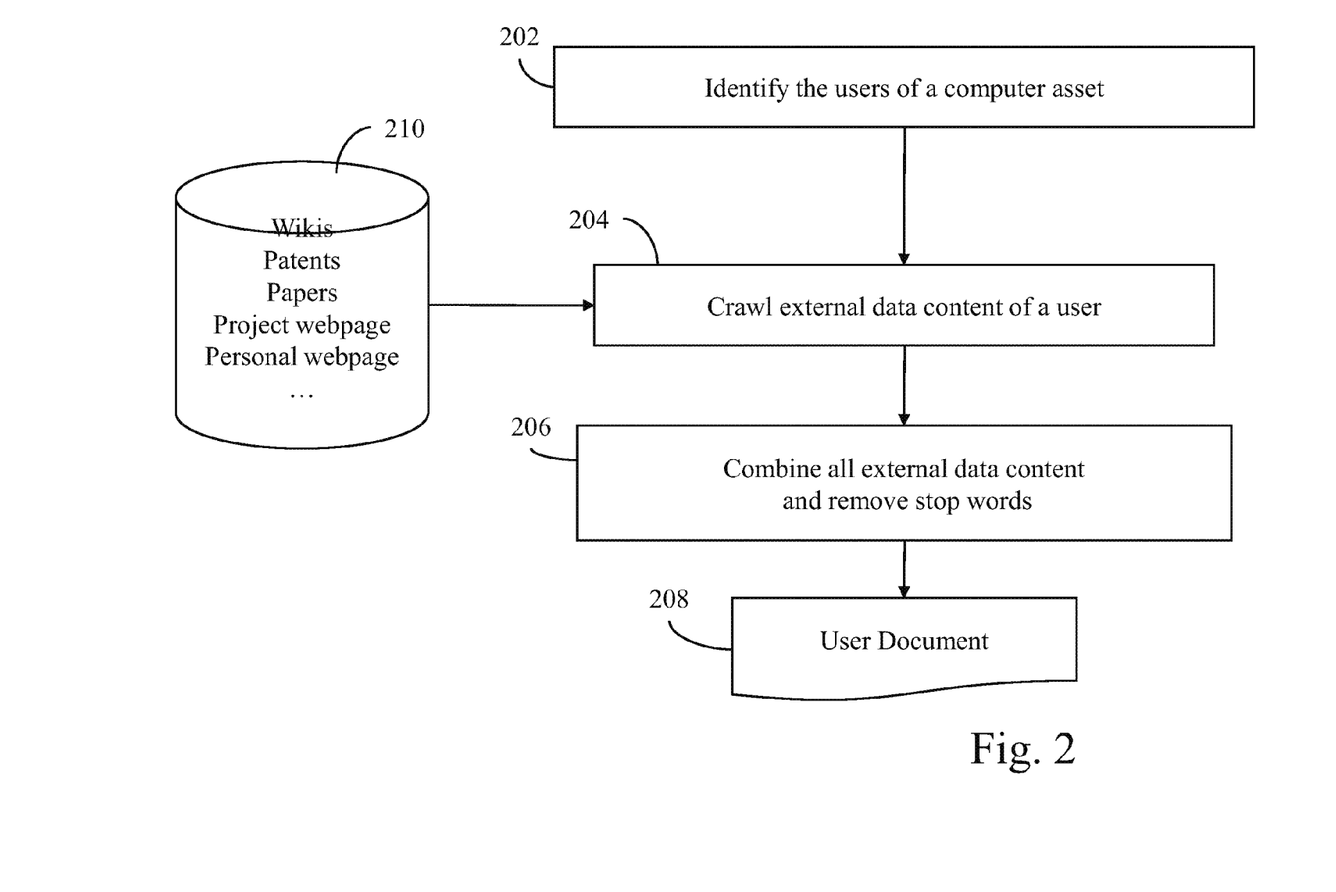
FIG. 2 shows a process of generating a pseudo document for a user from external data content in one embodiment of the present disclosure.

FIG. 2 shows a process of generating a pseudo document for a user from external data content in one embodiment of the present disclosure, e.g., shown at 104 in FIG. 1. At 202, one or more users of the computer or asset for which a topic is being estimated, is identified, e.g., as at 102 in FIG. 1, or a list of the identified users is received. At 204, external data content associated with a user is analyzed. Examples of the external data content may include, but are not limited to, one or more of wikis, patents, papers, project web pages, personal web pages, or combinations thereof, for example, shown at 210. At 206, all external data content associated with the user are combined and stop words may be removed. At 208, a document (pseudo document) is generated based on the combined external data content. The processing at 204, 206 and 208 may be performed for each identified user of the computer or the asset.

Figure 3:
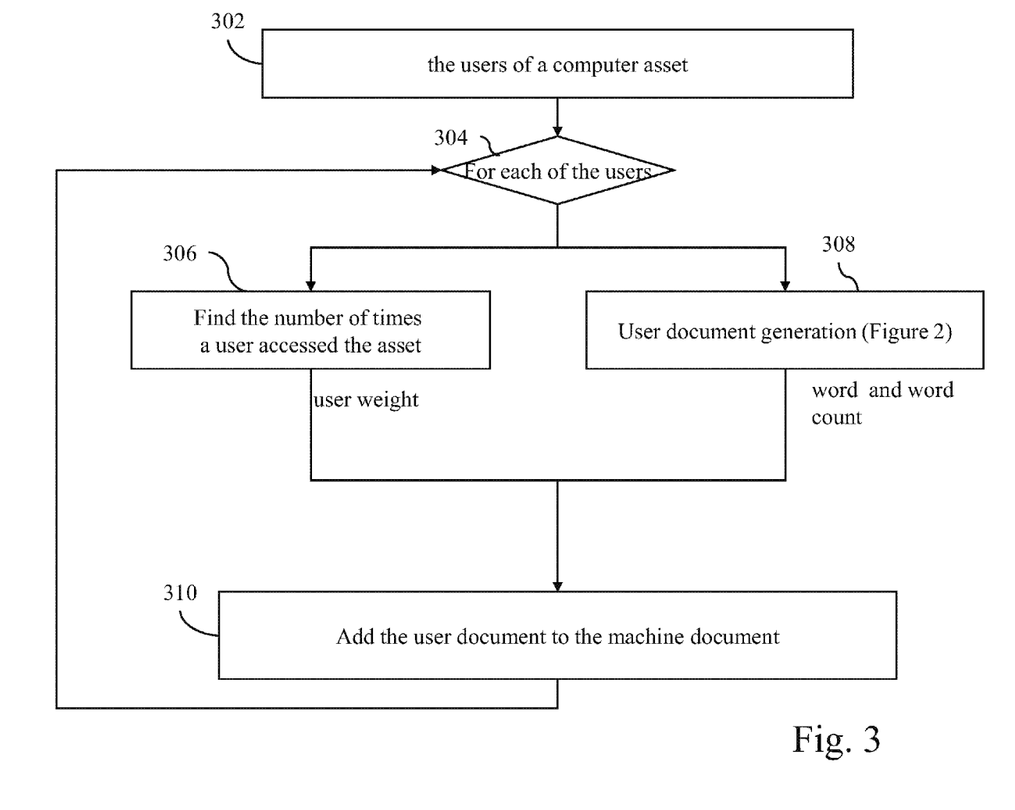
FIG. 3 illustrates a high level process of generating a document for a computer or asset.

FIG. 3 illustrates a high level process of generating a document for a computer or asset. At 302, identified users are received. As shown at the iteration loop at 304, the processing at 306, 308 and 310 may be performed for each identified user. At 306, the number of times a user accessed the asset is determined. At 308, the pseudo document generated for the user is obtained. The pseudo document, for instance, contains words and word count gathered from the external data content associated with the user. The pseudo document is further weighted or scored by the number of times a user accessed the asset. At 310, the weighted or scored contents of the pseudo document are added to the document associated with the asset.

Figure 4:
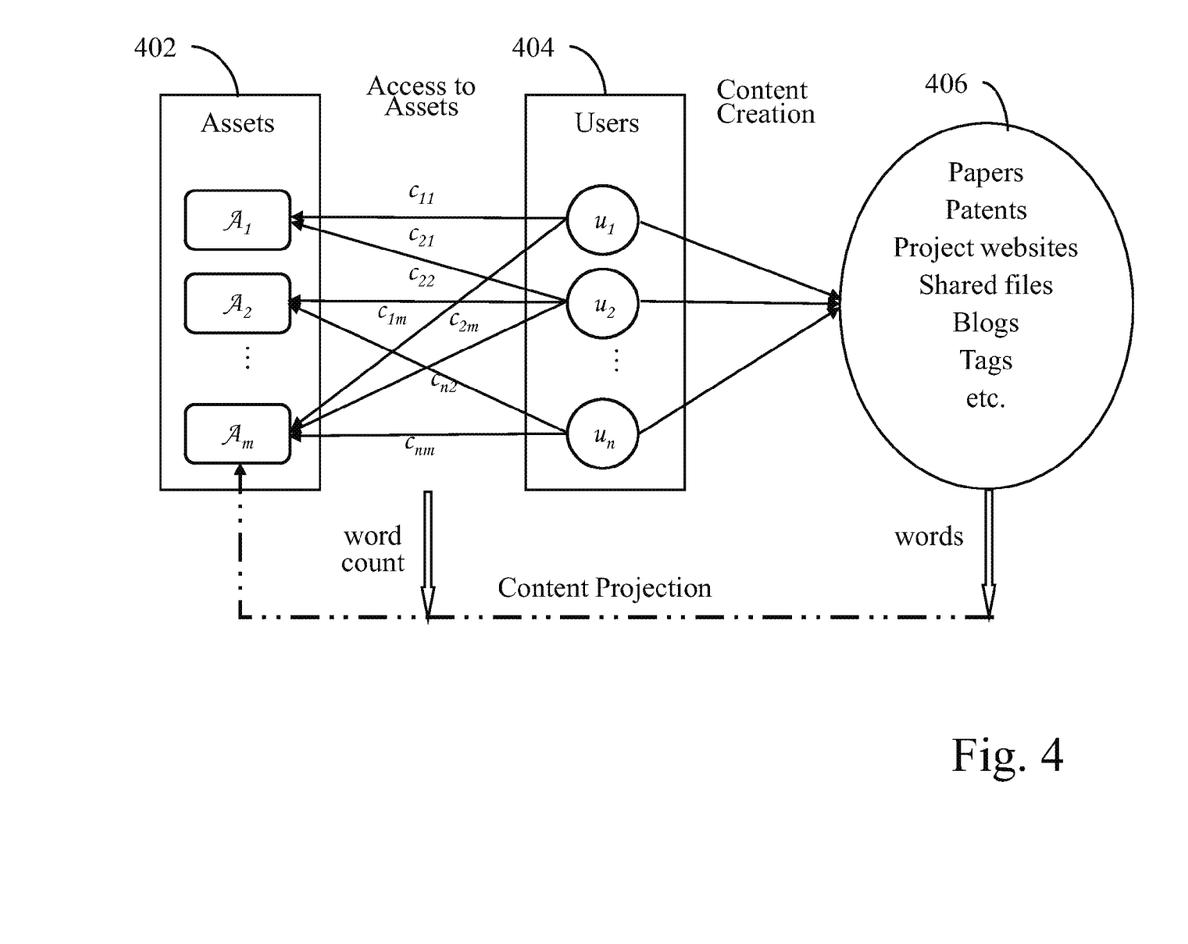
FIG. 4 illustrates data content projection in one embodiment of the present disclosure.

FIG. 4 illustrates data content projection in one embodiment of the present disclosure. The topic of the assets 402 (whose content may not be accessible) may be determined based on the content of accessible documents 406 associated with users 404 who access the assets 402. The frequency of access by those users may be used to provide weight or score to the count of words found in the accessible documents 406. The topic of the assets 402 may be determined based on the aggregate of the weighted accessible documents 406 of each user 404 who accessed the assets 402.

Consider as an example a set of machines as assets. Given a set of one or more machines (M), the method of the present disclosure in one embodiment may identify users in U, who accessed each machine, and how often they accessed the machines (C). These information may be collected, for example, from network connection logs or DNS lookup logs, or other logs or available information. This step produces an access count vector for each machine $M_i$, with an element $c_{ij}$ denoting the access count of user $U_i$ to machine $M_j$. The method in one embodiment of the present disclosure retrieves the user contents for each user by searching publicly available sources, e.g., in the company. Some examples of such external user contents may include, titles of communities and wikis, files the users shared, patents, papers, user profiles, bookmarks, blogs, forums, tags, etc. The user content of a user $U_i$, Content($U_i$), is a collection words extracted from these sources. Then, the content of a machine, Content($M_i$), is built using the contents of all the users who accessed the machine. In addition, the frequency of a word may be used in topic discovery. Words appearing with a high frequency influence more on the topic of a document than words appearing with very low frequency. In one embodiment of the method of the present disclosure, the word frequency may be simulated using the user's access frequency to the machine. The more a user accesses a computer, the more influence the user adds to the topic of the machine. More formally, let t be a word in a user's content, and the user accessed a machine m, c number of times. Then, the frequency of t in the content for m is multiplied by log(c), and the new frequency of t, f'(t)=log (c)×f(t). The same word t may have different frequency counts for different machines depending on the access counts to the machines by the user. The content of a machine is a union of the users' adjusted (weighted) user contents. Then, a topic modeling algorithm may be applied on the content collection. For example, Latent Dirichlet Allocation (LDA) may be applied to discover the topic distributions of all the machines.

Figure 5:
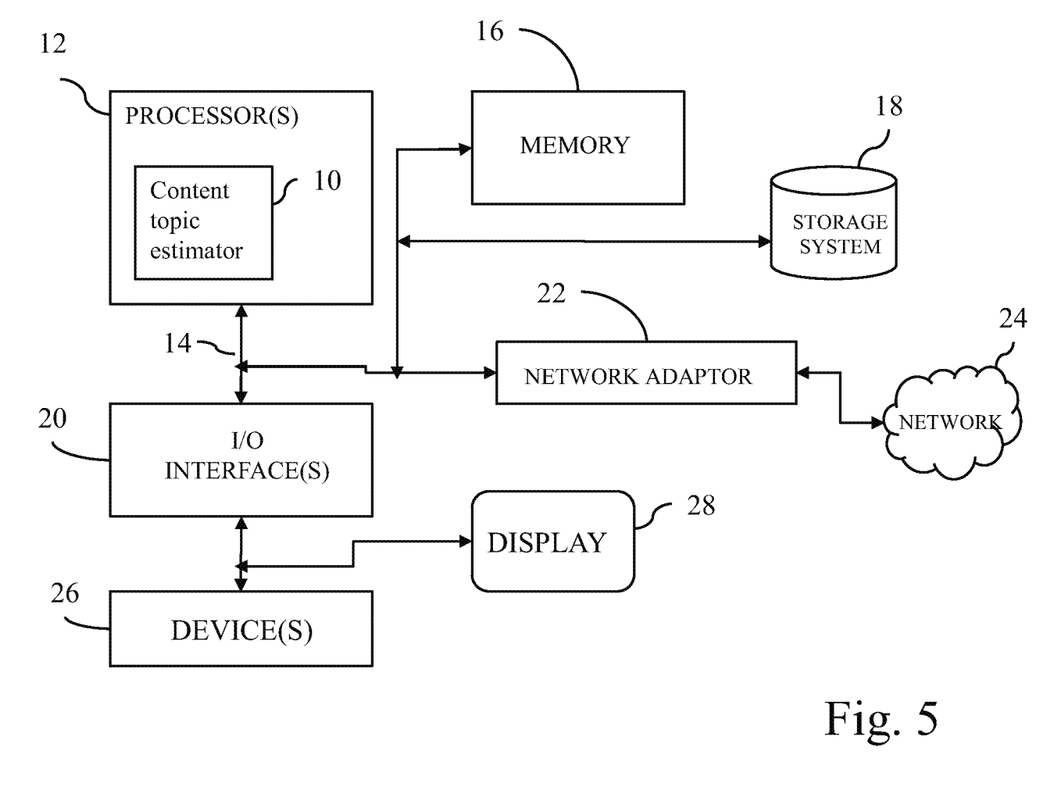
FIG. 5 illustrates a schematic of an example computer or processing system that may implement a content topic estimator system in one embodiment of the present disclosure.

FIG. 5 illustrates a schematic of an example computer or processing system that may implement the content topic discovery system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 5 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a content topic estimator module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A system to automatically estimate content topics of inaccessible content in a computer system without inspecting data files in the computer system comprising:
   a processor; and
   a module operator to execute on the processor and further operable to gather accessible content, the module further operator to analyze the accessible content to estimate one or more topics of the inaccessible content without inspecting the inaccessible content,
   the inaccessible content comprising privileged data protected from access due to one or more of data privacy and computer security, wherein the one or more topics of the inaccessible content is estimated while preserving the one or more of data privacy and computer security,
   the module estimating the one or more topics at least by:
      identifying users of the computer system and access counts of the users accessing the computer system, retrieving the accessible content generated by the users of the computer system, analyzing user information and external text content associated with the users that are available in an organization's online space outside of the computer system;
      for each of the users, generating a document comprising a bag-of-words representation for the inaccessible content generated by the user, the bag-of-words representation comprising words occurring in the accessible content and counts of the words, the counts of the words scaled as a function of a number of occurrences of a word in the accessible content and a computer system access count associated with the user;
      generating an asset document associated with the computer system by aggregating the document associated with each user for all users; and
      executing a topic modeling algorithm on the asset document that estimates the one or more topics,
      wherein based on the one or more topics, the module automatically determines security level of information stored in the computer system.

2. The system of claim 1, wherein the accessible content comprises accessible content at least created or consumed by a user.

3. The system of claim 1, wherein the accessible content is distributed over a set of enterprise machines.

4. The system of claim 1, wherein the module is further operable to apply a generative topic modeling algorithm to analyze the accessible content.

5. A computer readable storage device storing a program of instructions executable by a machine to perform a method to automatically estimate content topics of inaccessible content in a computer system, the method comprising:
   gathering accessible content; and
   analyzing the accessible content to estimate one or more topics of the inaccessible content without inspecting the inaccessible content,
   the inaccessible content comprising privileged data protected from access due to one or more of data privacy and computer security, wherein the one or more topics of the inaccessible content is estimated while preserving the one or more of data privacy and computer security,
   the analyzing further comprising:
   identifying users of the computer system and access counts of the users accessing the computer system, retrieving the accessible content generated by the users of the computer system outside of the computer system, analyzing user information and external text content associated with the users that are available in an organization's online space outside of the computer system;
   for each of the users, generating a document comprising a bag-of-words representation for the inaccessible content generated by the user, the bag-of-words representation comprising words occurring in the accessible content and counts of the words, the counts of the words scaled as a function of a number of occurrences of a word in the accessible content and a computer system access count associated with the user;
   generating an asset document associated with the computer system by aggregating the document associated with each user for all users; and
   executing a topic modeling algorithm on the asset document that estimates the one or more topics,
   wherein based on the one or more topics, the module automatically determines security level of information stored in the computer system.

6. The computer readable storage device of claim 5, wherein the accessible content comprises accessible content at least created or consumed by a user.

7. The computer readable storage device of claim 6, wherein the accessible content created or consumed by a user comprises at least one of website content, publication, patent, employee record, file sharing repository, bookmarks, and tags.

8. The computer readable storage device of claim 5, wherein the gathering accessible content comprises:
   identifying one or more users that accessed the computer system;
   for each of the one or more users,
      collecting content that are accessible and that said each user has at least created or consumed, and
      creating a pseudo document associated with said each user; and
   combining the collected content of all of the one or more users to create a document associated with the inaccessible content.

9. The computer readable storage device of claim 8, further comprising:
   for each of the one or more users, determining a frequency of access to the computer system by said each user, and scoring the pseudo document based on the frequency.

10. The computer readable storage device of claim 8, wherein the analyzing the accessible content comprises applying a topic modeling algorithm on the document associated with the inaccessible content.

11. The computer readable storage device of claim 10, wherein the algorithm comprises Latent Dirichlet Allocation.

12. The computer readable storage device of claim 5, wherein the accessible content and the inaccessible content are separately stored content.

13. The system of claim 1, wherein the accessible content and the inaccessible content are separately stored content.

\* \* \* \* \*